United States Patent [19]

Frohardt

[11] 4,260,386
[45] Apr. 7, 1981

[54] VARIABLE SPEED DRIVE

[76] Inventor: Steven P. Frohardt, 630 Veteran Ave., Los Angeles, Calif. 90024

[21] Appl. No.: 39,586

[22] Filed: May 16, 1979

[51] Int. Cl.³ ............................................. F16H 9/24
[52] U.S. Cl. ...................................... 474/72; 74/397; 280/238; 474/57; 474/141
[58] Field of Search ........... 74/217 S, 217 B, 217 CV, 74/217 R, 750 B, 805, 244, 689, 230.18, 230.19, 230.22, 594.2, 352, 397; 474/47, 49, 50, 52, 56, 57, 72, 141; 280/236, 238

[56] References Cited

U.S. PATENT DOCUMENTS

| | | | |
|---|---|---|---|
| 2,584,447 | 2/1952 | Hayot | 74/217 B |
| 3,798,989 | 3/1974 | Hunt | 74/244 |
| 3,850,045 | 11/1974 | Hagen | 74/244 |
| 3,935,751 | 2/1976 | Lee | 74/244 X |
| 3,969,948 | 7/1976 | Pipenhagen, Jr. | 74/230.22 X |
| 3,994,180 | 11/1976 | Ackerman | 74/217 CV |
| 3,995,508 | 12/1976 | Newell | 74/244 |
| 4,030,373 | 6/1977 | Leonard | 74/217 B X |
| 4,129,044 | 12/1978 | Erickson et al. | 74/217 B X |

Primary Examiner—C. J. Husar
Assistant Examiner—Moshe I. Cohen
Attorney, Agent, or Firm—Grover A. Frater

[57] ABSTRACT

A variable ratio, or adjustable ratio, mechanical drive mechanism employs a rotatable driving element the effective diameter of which may be changed. The driving element is segmented to permit effective diameter change by an alteration in the relative position of the segments.

Alteration is effected by forcing a change in the separation of the axis of driving element and the point of engagement of the driving element with the driven element.

20 Claims, 12 Drawing Figures

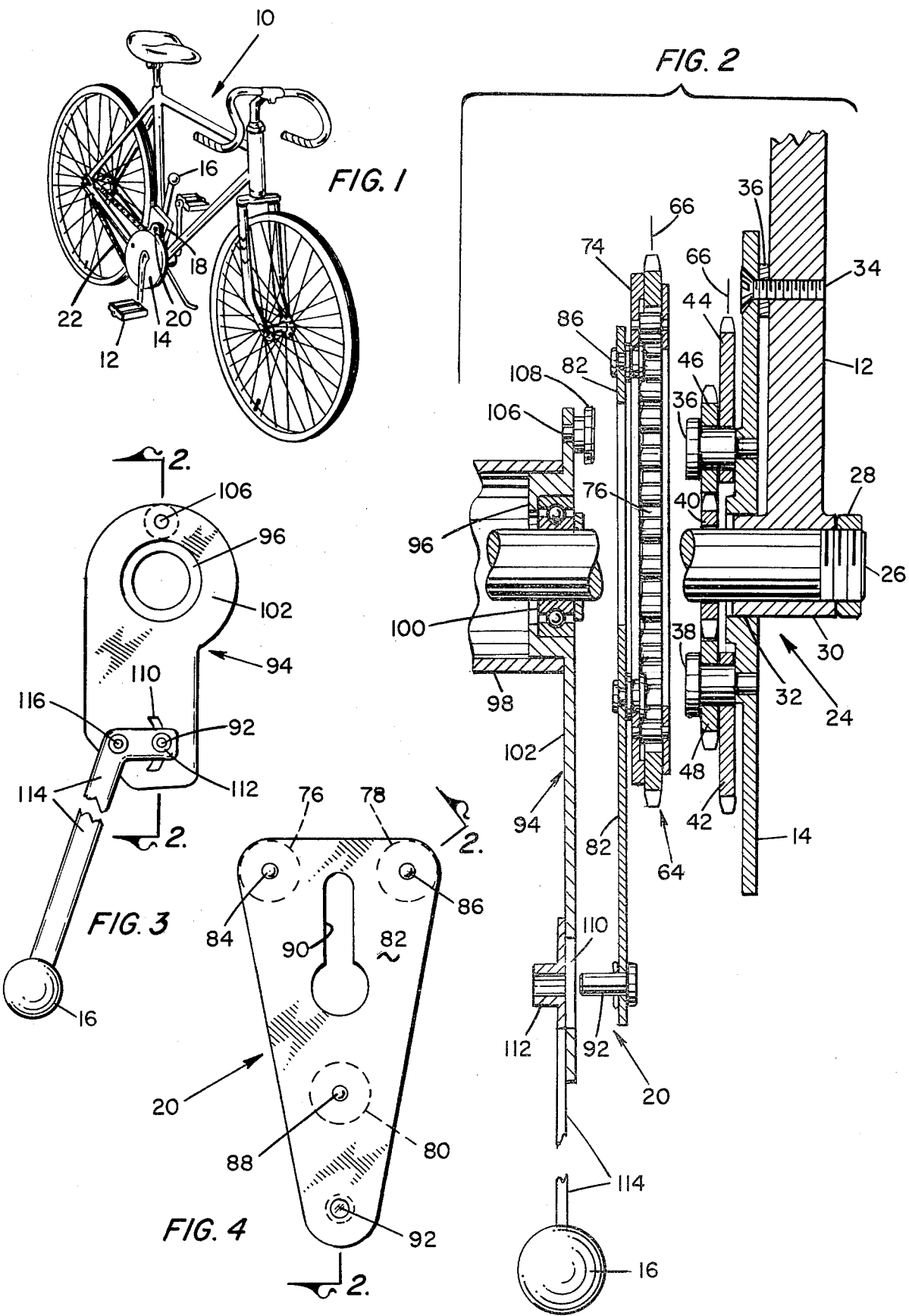

VARIABLE SPEED DRIVE

This invention relates to improvements in adjustable ratio, and variable ratio, mechanical drive systems.

BACKGROUND OF THE INVENTION

Notwithstanding that a wide variety of changeable ratio drive transmissions have been devised, the need for new and for improved structures of that kind has not been satisfied. Just as a wide variety of applications has created needs for fastening devices of widely different form, so, too, has a wide variety of practical applications created needs for many kinds and forms of variable ratio and adjustable ratio mechanical motion transmission systems, and the needs continue. Among them is a requirement for an adjustable ratio drive structure that can be packaged in minimum width, in which the ratio change can be accomplished in small incremental steps, which has relatively high transmission efficiency, and the ratio of which can be changed during drive operation.

There are a variety of applications for a device with those attributes. By way of example, it is that very list of attributes that is required in an adjustable ratio drive system for bicycles and small motor bikes.

SUMMARY OF THE INVENTION

It is an object of this invention to provide improved changeable ratio mechanical drive systems. Structures provided by the invention include both positive drive and friction drive systems, and one of its objects is to provide an improved structural arrangement which can be produced in either of those forms.

While the invention has other applications for which it is an object to provide a solution, a specific objective is to provide an adjustable ratio transmission for vehicles, especially for bicycles and motor bikes.

It is among the objects of the invention to provide a drive system that includes a driven element and a drive element which drive element is rotatable and is maintained in driving engagement with the driven element such that the degree of movement of a point on the driven element is directly related to the angular displacement, and to the distance from its axis of rotation, of a point on the rotatable drive element. That is coupled with a means for altering the separation of that axis of rotation and that point whereby the ratio with which the driven element and drive element are displaced relative to one another is changed as a function of that separation. In one preferred form the output element is formed as an annulus a portion of whose inner surface is coupled to be driven by a variable or an adjustable diameter driving element disposed within the annulus. Another object is to provide an adjustable speed drive the form of which makes it suitable for inclusion in bicycles and motor bikes and in which the driving element is operated by the pedals of the bicycle, or motor bike, and the output element of which is a gear which drives a conventional bicycle chain. The driving element comprises a segmented gear the segments of which are adjustable to change the effective diameter of that driving gear and in which its effective diameter is altered by the simple expedient of altering the center of rotation of the driven gear.

The preferred embodiments of the invention, the best thus far devised, are illustrated in the accompanying drawings and in the detailed descriptions that follow. However, notwithstanding that these descriptions have been made specific, they will make it apparent to artisans that other forms and embodiments of the invention are possible. In that connection, the scope of the invention is to be measured not by the accompanying drawings but by the scope of the appended claims.

THE DRAWINGS

In the drawings:

FIG. 1 is a side view of a bicycle the transmission system of which embodies the invention;

FIG. 2 is an exploded view of portions of the transmission system of FIG. 1 parts of which are shown in cross-section;

FIG. 3 is a view in side elevation of the base plate and shift lever assembly of FIG. 2 in which the shift lever is shown fragmented;

FIG. 4 is a view in front elevation of the output gear positioning assembly;

DETAILED DESCRIPTION OF THE DRAWINGS

Figure 6:
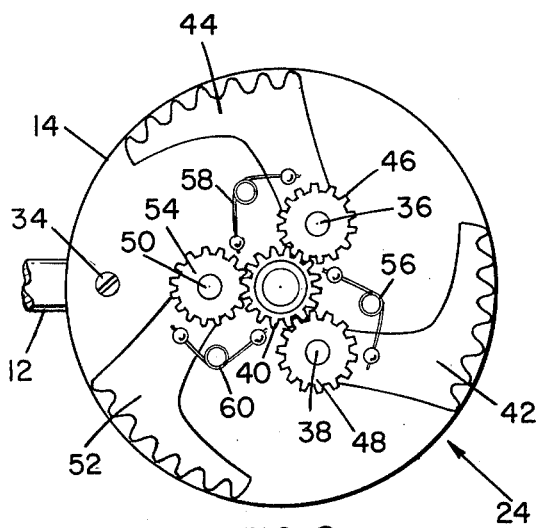
FIG. 6 is a view in rear elevation of the input member assembly in which the associated drive pedal is shown fragmented.

While the invention is suitable for use in other applications, it is particularly suitable for use in the transmissions of bicycles and of motor bikes and mopeds, and the like, and a preferred form of the invention for that application has been selected for illustration in FIGS. 1 through 6 of the drawing. A bicycle, generally designated 10, and upon which a transmission system of the invention has been installed, is illustrated in FIG. 1. The system uses conventional pedals one of which, 12, is visible in the drawing. Also visible are a cover plate 14 and a gear shift lever knob 16, shown in conjunction with a mounting plate 18 and a portion of the output gear positioning assembly 20.

In FIG. 1, the numeral 22 designates the bicycle drive chain which interconnects the output gear assembly, not visible in FIG. 1, with the rear sprocket of the bicycle. In the embodiment shown, that rear sprocket may be coupled to a conventional drive and brake system. The form of the transmission system selected for illustration permits driving the chain in either direction. It will become apparent that the invention lends itself to the production of a drive system which will drive in only one direction.

In FIG. 2, the numeral 24 designates the input member assembly which is shown affixed to a pedal shaft 26. The shaft extends through a bore in the end portion 30 of the arm of pedal 12. That end portion 30 has a cylindrical section or extension 32 which extends laterally along the shaft 26. The cover plate 14 is fixed to that lateral extension 32 in that the plate 14 has a central opening into which the extension 32 is press-fitted. To ensure that there is no relative rotation between the drive pedal 12 and the cover plate 14, the pedal lever is bored and threaded to recieve a screw fastener 34 which extends through the cover plate 14 and a spacer 36 to threaded engagement in the pedal shaft.

A comparison of FIGS. 2 and 6 will show that the cover plate 14 is circular and that three pivot pins extend from its rear face. The pivot pins extend through holes in the cover plate. Their respective axes are parallel with one another and with the central axis of the cover plate, and the axes of the three pins are equi-distant from the central axis of the unit, and they are arranged 120 degrees apart. The section of FIG. 2 is taken on a meandering line so that it includes two of the pivot pins, 36 and 38, the central drive or input gear 40 (which is not connected to the main drive shaft but only controls equal movement of the drive segments), and the full length of drive segments 42 and 44. Also shown in FIG. 2 are the segment gear 46 which meshes with input gear 40 and is fixed to segment 44. Also visible is gear 48 which meshes with the input gear 40 and is fixed to the segment 42. Returning to FIG. 6, the third pivot pin is numbered 50. It is the pivot pin for segment 52 which is fixed to the segment gear 54. Like the others, gear 54 meshes with the input gear 40. There are three springs in FIG. 6, numbered 56, 58 and 60, respectively. Those springs are not visible in FIG. 2. In each case they are fixed at one end to the cover plate 40 and at the other end to a respectively associated one of the segments. Spring 58 is connected to segment 44, spring 56 is connected to segment 42, and spring 60 is connected to segment 52. It is the function of those springs to tend to bias the segments toward clockwise rotation in FIG. 6. Acting together, the three segments, 42, 44 and 52, define a driving gear. The segments are formed with driving portions which engage and drive the output gear.

The three segments, 42, 44 and 52, have their outer surfaces formed generally as a spiral which is fitted with teeth. Those teeth mesh with an inner row of teeth in the output gear assembly when that gear assembly is fitted over the three segments, such that the output gear assembly lies generally in the same plane as those segments. That plane has been given the identifying numeral 66 in FIG. 2.

Figure 5:
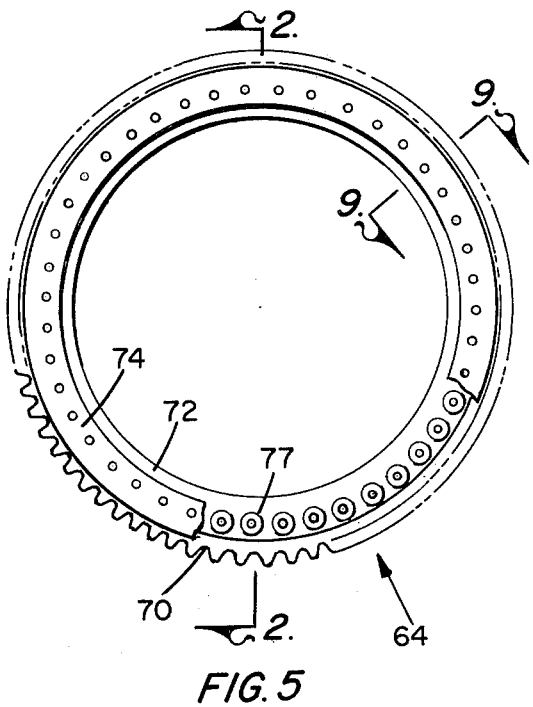
FIG. 5 is a view in rear elevation of an output gear assembly one ring of which is shown fragmented.
Figure 10:
FIG. 10 is an isometric view of one of the spacer elements.
Figure 9:
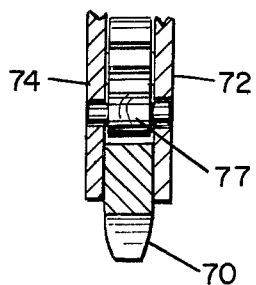
FIG. 9 is a cross-sectional view taken on line 9—9 of FIG. 5.

Comparison of FIGS. 2 and 5 will show that the output assembly is formed by a gear ring 70 whose outer circumference is formed as a series of gear teeth of a size to mesh with a standard bicycle chain. The gear ring is sandwiched between a forward ring 72 and a rearward ring 74. The inner diameter of the gear ring 70 is less than the outer diameter of the rings 72 and 74, but it is greater than the inside diameter of either of them. As a consequence of that arrangement, an annular recess is provided, bounded at the sides by rings 72 and 74 and at the bottom by the inner cylindrical wall of the gear ring 70. A series of cylindrical spacers, like the spacer 77 of FIGS. 5 and 10, are disposed in that recess where they serve as gear teeth in cooperation with the teeth formed in the outer surfaces of the segments 42, 44 and 52. Those spacers are each mounted on a pin that extends through the spacer and through rings 72 and 74. Those pins are press-fitted into the openings of both of the rings 72 and 74, and it is by that means that the rings are clamped securely to the sides of the gear ring 70 so that relative movement between the rings 70, 72 and 74 is precluded.

Figure 7:
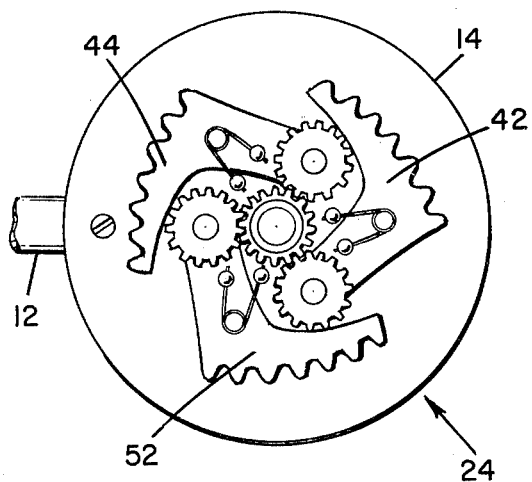
FIG. 7 is a schematic representation of the apparatus of FIG. 6 in a different drive condition.

In FIG. 7, it is illustrated that the segments 42, 44 and 52 may be forced against the bias of their respective biasing springs 56, 58 and 60 (See FIG. 6) so that the outer toothed surface of those several segments can be made to define a gear of smaller diameter than the gear defined by those segments in FIG. 6. When the segments are positioned, as they are shown to be in FIG. 7, then the teeth at the driving surfaces of those segments will not engage the "gear tooth" spacer 77 and the others like it unless the output gear structure 64 is moved relative to the input gear assembly 24 so that the axis of rotation of the gear assembly 64 is displaced from, but parallel to, the axis of rotation of the input gear assembly 24. If the output gear assembly 64 and the input assembly 24 are assembled so that they occupy the same plane, the rotational axis of the two assemblies will be coincident when the segments have the position shown in FIG. 6, but the axes are necessarily displaced if the input gear segments and the output gear assembly are to be meshed when the segments have the position depicted in FIG. 7. When the segments have the position shown in FIG. 6, the ratio of input to output rotation is one to one. On the other hand, the circumference of the circle defined by the segments in FIG. 7 is approximately half of the circumference defined by those segments in FIG. 6. As a consequence, the ratio of motion transmission from the input gear assembly to the output gear assembly is approximately two to one when the segments have the position depicted in FIG. 7.

Returning to FIG. 2, a means is provided by which the output gear assembly may be moved in its plane 66 such that its axis of rotation is displaced from the axis of input gear assembly rotation. That means must be arranged to permit rotation of the output gear assembly and, in this preferred construction, that function is performed by the output gear positioning assembly 20. The cross-sectional view of that element, as it is shown in FIG. 2, is taken along a meandering line identified in FIG. 4. It has been taken along that line to illustrate that the guide rollers 76, 78 and 80 are mounted for rotation upon the output gear positioning plate 82 by respectively associated pivot pins 84, 86 and 88. The three guide rollers are formed as spools each comprising a central cylindrical portion and flanges of slightly larger diameter at each end of that central cylinder to form a spool. The three guide rollers, or spools, are spaced so that, when assembled with ring 74 of the output gear assembly, one flange of each spool lies on one face of ring 74 and the other flange of the spool lies on the opposite side of ring 74. As a consequence, the output gear assembly is free to rotate relative to the output gear positioning plate 82 because the three spools serve as guide rollers which engage and rotationally guide the inner cylindrical wall of the ring 74. If the output gear positioning plate 82 is moved up or down, relative to the plate 14 in FIG. 2, the output gear 64 will be moved up or down in corresponding degree. When that gear 64 is assembled with the input drive assembly, movement of the output gear positioning plate, up or down, will force the input gear segments 42, 44 and 52 to counter-clockwise rotation and smaller diameter or, when the output gear 64 is moved by the output gear positioning plate 82 so that its axis is coincident with the input gear assembly axis, the gear segments 42, 44 and 52 are permitted to rotate in a clockwise direction at the urging of their respective bias springs.

The output gear positioning assembly 20 is limited to movement along one line of action in a plane parallel to plane 66. As best shown in FIG. 4, the output gear positioning plate 82 of that assembly is formed with an elongated slot 90 in the region between the three guide rollers. That slot is elongated in a direction toward a positioning pin 92. That pin extends rearwardly from the plate 82 in a direction toward the view in FIG. 4. The pin and the slot cooperate with a base plate and operating lever assembly generally designated 94 in FIGS. 2 and 3. That plate is formed integrally with a cylindrical or extension portion 96 near one end which fits into the pedal shaft pillow block 98 of the bicycle frame. The outer race of a ball bearing assembly 100 is press fitted into the inner diameter of the cylindrical extension 96. The pedal shaft 26 fits through the inner race of that bearing. As a consequence, the base plate 102 is fixed against motion relative to the bicycle plane to one side of the pillow block. At the side of the laterally extending cylinder portion 96, a guide pin 106 is mounted. The pin comprises a cylindrical member having a diameter just smaller than the width of the slot 90 in the output gear positioning plate 82. In assembled condition, it extends through that slot and is retained there by a flange 108 at the outer end of the pin 106. At the other end of the base plate 102, on the opposite side of the cylindrical extension 96, the base plate is formed with an arcuate slot 110 through which the pin 92 of extension 20 extends. In assembled condition, it extends through that slot into a collar 112 which is fixed to a shift lever 114 which has a pivotal connection to the base plate 102 at a pivot pin 116. The ball handle 16 is secured to the end of that lever.

It will be apparent from an examination of FIG. 3, taken together with the other figures, that once the several assemblies are assembled into a composite structure, rotation of the shift lever 114 will result in motion of the output gear positioning assembly 20 and the output gear assembly 64 along the line of action that extends through pin 106 and pin 92. If the output gear assembly is moved to a position in which its axis of rotation coincides with that of the pedal shaft 26 and the input gear assembly, the several segments, 42, 44 and 52, will be rotated clockwise by their respective bias springs so that the gear spacers that form the inner gear of assembly 64 will be engaged by all three of the segments simultaneously. In that circumstance, the input to output gear ratio is one to one. On the other hand, if the shift lever is moved so that the output gear positioning plate 82 is forced to the limit of its travel, one of the segments 42, 44 and 52, the one which is in engagement with the inner gear of the output gear assembly 64, will be forced to counterclockwise rotation. Since all of the segments are interconnected, in that they all mesh with the center input gear, all of the segments will be moved to counterclockwise rotation to the condition depicted in FIG. 7 whereupon the ratio of input to output turns will have been changed to the ratio two to one. Other ratios result when the output gear assembly is forced to positions intermediate the extremes depicted in FIGS. 6 and 7.

It can be demonstrated that the input and output gears will not mesh properly unless the number of teeth available for engagement by the teeth of the several input gear segments is exactly divisible by the number of segments. When, as here, there are three segments, the number of "teeth" or "spacers" that form the inner gear of the output gear assembly 64 is a number that is exactly divisible by three. It will be apparent, of course, that other numbers of segments can be employed in the invention.

In this embodiment, the teeth of the segments are formed so that the output gear assembly can be driven in either direction. While the bias springs 56, 58 and 60 apply only light pressure, that pressure is sufficient, in combination with the gear form, to permit driving the system in the reverse direction. However, it will be apparent that the amount of torque that can be transmitted in one direction is substantially greater than the amount of torque that can be transmitted in the opposite direction. When the inner gear 40 is turned in the counterclockwise direction, the gear segments are forced into contact with the inner teeth of the output gear assembly.

Figure 11:
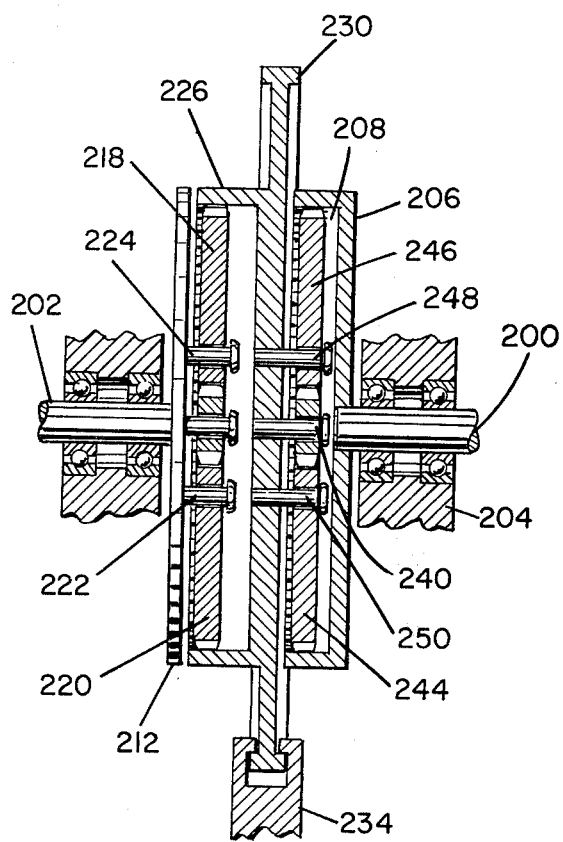
FIGS. 11 and 12 are diagramatic representations of an alternative form of the invention in each of two conditions.
Figure 12:
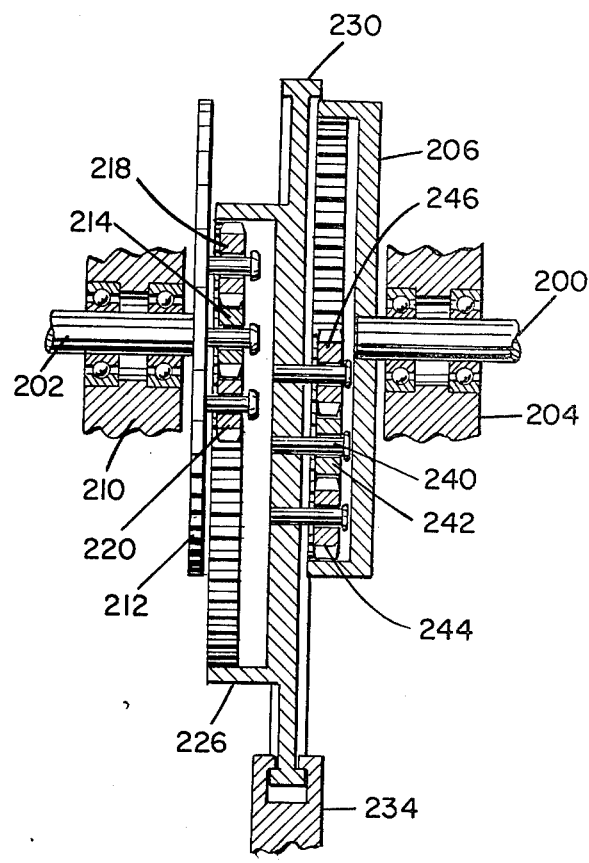
Figure 8:
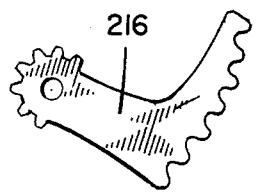
FIG. 8 is a view in elevation of an alternative form of gear segment.

Another form of the invention is depicted in FIGS. 8, 11 and 12. The showing here is schematic. FIGS. 11 and 12 show the same apparatus in two different operating conditions. In FIG. 11, the output shaft 200 turns at the same speed as does the input shaft 202. Shaft 200 is mounted in a pillow block 204. It has fixed connections to, and it extends axially from, the bottom of a cylindrical cup 206 whose inner wall is formed with a set of gear teeth that extend entirely around its inner periphery. The input shaft 202 is mounted on an axis coincident with the axis of the output shaft 200. It is mounted on a pillow block 210 and it extends through a cylindrical input plate 212. At the side opposite the pillow block, that input shaft is fixed to an input drive gear 214 which meshes with a plurality of gear segments such as the segment 216 shown in FIG. 8. There are four segments, but only two of them are visible in FIGS. 11 and 12 where they are numbered 218 and 220, respectively. Each of those gear segments is mounted on a pivot pin that is fixed to the input plate 212. The pin for segment 220 is numbered 222. The pin on which segment 218 is mounted is numbered 224.

The teeth of segments 218 and 220 are engaged in the set of teeth that are formed entirely around the inner periphery of a second cup 226. The segments 218, 220 and the drive gear 214 are contained in that cup 226.

The cup 226 is provided with an outwardly extending flange 230 the outer margin of which is engaged, at the bottom of FIGS. 11 and 12, in a mechanism 234 and by which the cup 226 and its flange 230 can be moved in a plane perpendicular to the axis of the input and output shafts.

A pin 240 is fixed to the bottom wall of the cup 226 and extends in the direction of its axis on a line parallel with the axis of the input and output shafts. In FIG. 11, the pin 240 has its axis coincident with that of the input and output shafts, and in FIG. 12, pin 240 has its axis located at a position below that of the input and output shafts. The pin 240 does not rotate relative to cup 226, but it mounts a gear 242 which is free to rotate relative to the shaft of pin 240. That gear is in mesh with each of four gear segments only two of which are visible in FIGS. 11 and 12 where one of them is numbered 244 and the other is numbered 246. Gear segment 246 has a pivotal mounting on a shaft 248, and gear segment 244 has a pivotal mounting on a shaft 250.

There is a means, not shown for the sake of clarity, by which the segments are biased to the position that they are shown to occupy in FIG. 11. When the cup 226 is displaced, as it is shown to be in FIG. 12, the cup is forced into engagement with the uppermost segments on the input side and the lowermost segments on the output side of the unit so that they are made to assume a position such that they define a smaller gear. Because those segments are enmeshed with a common gear 214 on the input side and 242 on the output side, all of the segments of the set are made to rotate whereby to change the effective diameter of adjustable diameter gear system. In this case, the diameter of both of the segmented gear units is reduced to half, in FIG. 12, of what their diameter was in FIG. 11. As a consequence, there is a speed change in the ratio of two to one on each side of the cup 226 so that the total ratio of change is four to one.

Although I have shown and described certain specific embodiments of my invention, I am fully aware that many modifications thereof are possible. My invention, therefore, is not to be restricted except insofar as is necessitated by the prior art.

I claim:

1. A variable speed drive comprising, in combination:
    a driven element rotatable about a first axis;
    a rotatable drive element rotatable about a second axis in driving engagement with the driven element such that degree of movement of a point on the driven element is directly related to the angular displacement, and to the distance from said second axis of rotation, of a point on said rotatable drive element; and
    means for altering the separation of said axis of rotation and said point on said rotatable drive element as an incident to separation of said first and second axes.

2. The invention defined in claim 1 which further comprises means for maintaining said rotatable drive element in driving engagement with said driven element.

3. The invention defined in claim 2 in which said first and second axes are substantially parallel.

4. The invention defined in claim 3 in which said driven element and said drive element are rotatable about parallel axes.

5. The invention defined in claim 1 which further comprises:
    means for biasing said drive element and said driven element in a relative direction such that their axes tend toward greater separation; and
    means for selectively altering the separation of said axes whereby driving engagement between said driving and driven elements is maintained despite change in said separation.

6. The invention defined in claim 5 in which said rotatable drive element comprises a plurality of movable segments each having a driving portion capable of driving engagement with said driven element; and
    means for positioning said segments relative to one another such that their driving portions define at least three points on a circle having at its center the axis of said driving element.

7. The invention defined in claim 5 in which said rotatable drive element includes at least three points disposed to define a circle centered at said axis of rotation of said drive element.

8. The invention defined in claim 7 in which said rotatable drive element comprises at least three segments each having a driving portion which, in consort with the driving portions of the other of said segments, defines a circle;
    the driving engagement of said driven element and said driving element occurring, at any angular displacement of said driving element, between said driven element and the driving portion of at least one of said segments.

9. The invention defined in claim 8 in which said segments are mounted for angular displacement about respectively associated ones of parallel axes each equidistant from the axis of rotation of said driving element.

10. The invention defined in claim 9 in which said driving element further comprises segment drive means for angularly displacing said segments simultaneously in like amount while maintaining driving engagement between said driven element and at least one of said segments.

11. The invention defined in claim 10 in which said drive means further comprises resilient means for biasing said segments such that each tends toward angular displacement to increase the spacing from the axis of rotation of said drive means and the driving portions of said segments.

12. The invention defined in claim 10 in which said driven element comprises an annulus and in which said segments lie within, and are angularly displaceable in, the plane of said annulus.

13. The invention defined in claim 10 in which said segment drive means comprises a gear and in which each of said segments is formed with gear teeth enmeshed with the teeth of said drive gear.

14. The invention defined in claim 13 in which the driving portion of each of said segments is formed with gear teeth and in which the portion of said driven element which is engaged by said segments is formed with gear teeth capable of being engaged by said gear teeth of said segments.

15. A variable speed drive comprising, in combination:
    a driven element;
    a rotatable drive element in driving engagement with the driven element such that degree of movement of a point on the driven element is directly related to the angular displacement, and to the distance from its axis of rotation, of a point on said rotatable drive element;
    means for altering the separation of said axis of rotation and said point on said rotatable drive element;
    means for maintaining said rotatable drive element in driving engagement with said driven element;
    said driven element being rotatable in response to rotation of said drive element;
    said driven element and said drive element being rotatable about parallel axes;
    separation of said axis and said point on said drive element being made to vary in proportion to the separation of said axes;
    means for biasing said drive element and said driven element in a relative direction such that their axes tend toward greater separation;
    means for selectively altering the separation of said axes whereby driving engagement between said driving and driven elements is maintained despite change in said separation;
    said rotatable drive element including at least three points disposed to define a circle centered at said axes of rotation of said drive element;
    said rotatable drive element comprising at least three segments each having a driving portion which, in consort with the driving portions of the other of said segments, defines a circle;
    the driving engagement of said driven element and said driving element occurring, at any angular displacement of said driving element, between said driven element and the driving portion of at least one of said segments;

said segments being mounted for angular displacement about respectively associated ones of parallel axes each equidistant from the axis of rotation of said driving element;

said driving element further comprising segment drive means for angularly displacing said segments simultaneously in like amount while maintaining driving engagement between said driven element and at least one of said segments;

said driven element comprising an annulus and said segments lying within, and being angularly displaceable in, the plane of said annulus; and said means for selectively altering the separation of the axes of said driven element and said driving element comprising drive ratio changing means for displacing said annulus in said plane relative to the axis of rotation of said drive element.

16. The invention defined in claim 15 which further comprises parallelism maintaining means for maintaining said annulus and said segments in substantially the same plane when the diameter of the circle defined by the driving portion of said segments is less than the inner diameter of said annulus.

17. The invention defined in claim 16 in which said parallelism maintaining means comprises a plurality of guides interconnecting said driven element and said ratio changing means.

18. A variable speed drive comprising, in combination:

a driven element in the form of a circular gear;

a rotatable drive element in driving engagement with said driven element and comprising a gear the diameter of which may be altered;

said driven element and said drive element being rotatable about respectively associated parallel axes; and means for altering the separation of said axes of rotation whereby the effective ratio of said gears is altered.

19. The invention defined in claim 18 in which the effective diameter of said drive element is variable as an incident to a change in the separation of said axes.

20. The invention defined in claim 19 which further comprises means for selectively altering the separation of the axes of said driven element and said driving element in the form of drive ratio changing means for displacing said drive element in a plane parallel to the plane of said drive element.

* * * * *